United States Patent [19]
York

[11] 3,801,166
[45] Apr. 2, 1974

[54] DRAWER SLIDE BEARING RETAINER LOCK

[75] Inventor: William D. York, Indianapolis, Ind.

[73] Assignee: Herbert S. Fall, Indianapolis, Ind.

[22] Filed: Jan. 5, 1973

[21] Appl. No.: 321,292

[52] U.S. Cl. .................................. 308/3.8, 312/348
[51] Int. Cl. ............................................. F16c 21/00
[58] Field of Search .............. 308/3.8, 6 C; 312/343, 312/341, 344, 346, 347, 333, 348

[56] References Cited
UNITED STATES PATENTS
| | | | |
|---|---|---|---|
| 3,205,025 | 9/1965 | Jordan .................................. | 308/3.8 |
| 3,186,772 | 6/1965 | Cohn .................................... | 308/3.8 |
| R25,428 | 7/1963 | Manson .............................. | 312/343 |

FOREIGN PATENTS OR APPLICATIONS
| | | | |
|---|---|---|---|
| 219,364 | 12/1958 | Australia.............................. | 308/3.8 |

Primary Examiner—Charles J. Myhre
Assistant Examiner—R. H. Lazarus
Attorney, Agent, or Firm—Hood & Coffey

[57] ABSTRACT

A slide comprising a pair of telescopically related track members, ball bearings supporting the track members for relative longitudinal movement, a cage or retainer for the ball bearings longitudinally movable relative to the track members, and a device for locking the retainer against movement from a predetermined locking position relative to one of the track members when the other of the track members is moved longitudinally out of engagement with the said one track member. The locking device includes a locking member carried on the retainer and a cooperating locking member carried on the said one track member, the locking members being engageable when the retainer is in its said locking position and the said other track member is disengaged from the said one track member.

15 Claims, 6 Drawing Figures

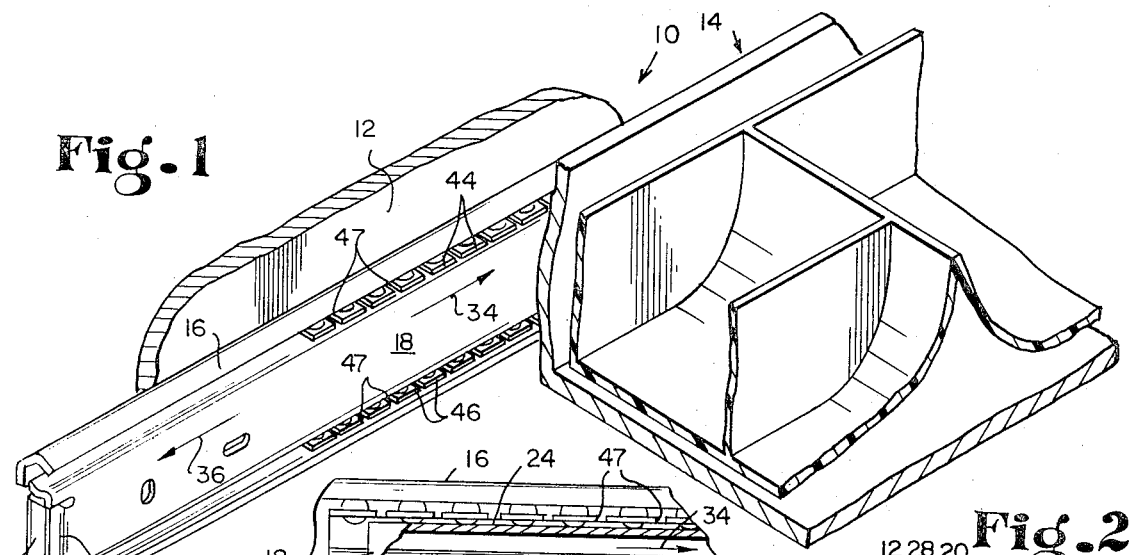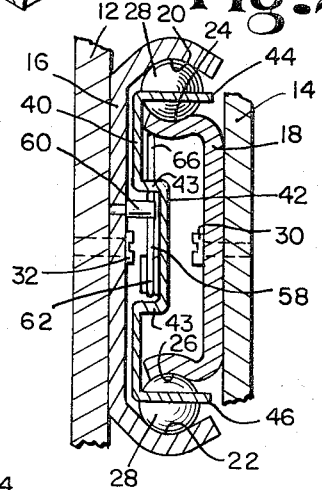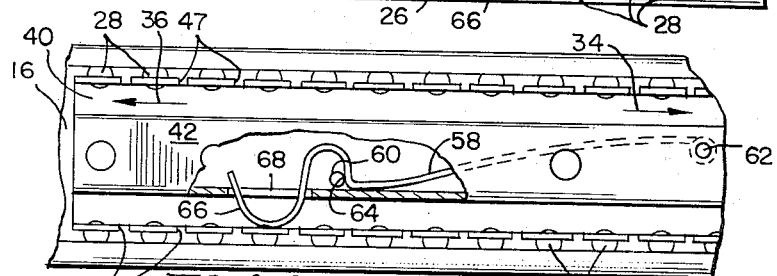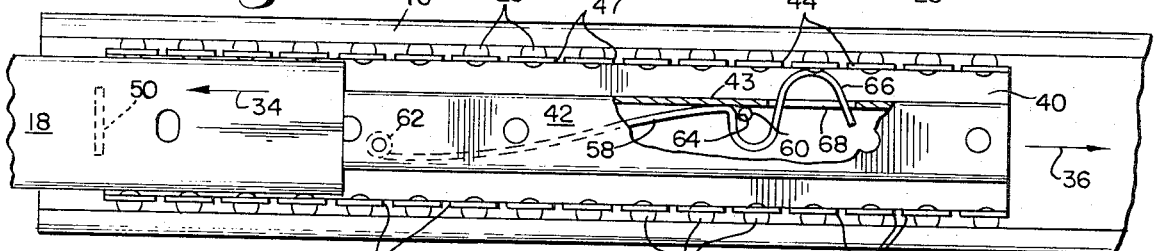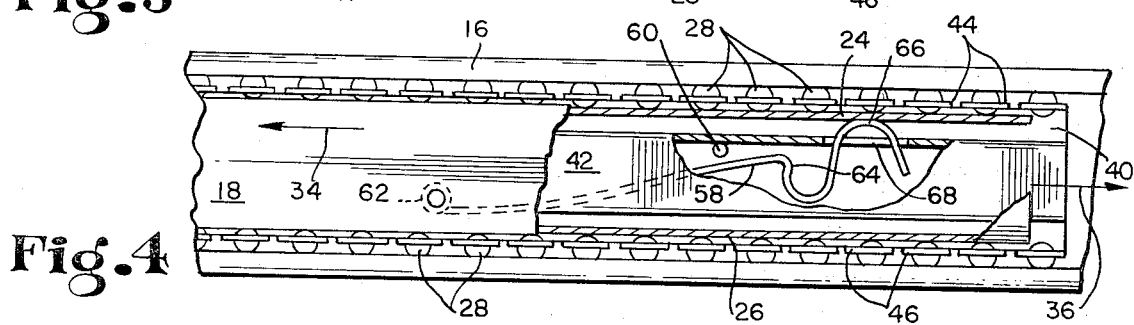

DRAWER SLIDE BEARING RETAINER LOCK

The present invention relates to slides or drawer slides, and more particularly to the provision of means for locking the bearing retainers of such slides against movement from a predetermined locking position relative to one of the cooperating track members when the other of the track members is moved longitudinally out of engagement with the said one track member.

It is common to provide a slide comprising a first elongated track member formed to provide a downwardly facing longitudinal raceway and an upwardly facing longitudinal raceway and a second elongated track member formed to provide an upwardly facing longitudinal raceway in mating registry with the first said downwardly facing raceway and a downwardly facing longitudinal raceway in mating registry with the first said upwardly facing raceway. Ball bearings are disposed in the said mating raceways to support the track members for relative longitudinal movement, and bearing cages or bearing retainers for maintaining the longitudinal spacing between the bearings in the raceways are conventionally provided. Such retainers or retainer means are longitudinally movable relative to the track members.

Such slides with such bearing cages or bearing retainers are shown, for instance, in U.S. Pat. No. 3,205,025 issued Sept. 7, 1965; U.S. Pat. No. 3,488,097 issued Jan. 6, 1970; U.S. Pat. No. 3,389,949 issued June 25, 1968; U.S. Pat. No. 2,606,090 issued Aug. 5, 1952; U.S. Pat. No. 3,687,505 issued Aug. 29, 1972; and U.S. Pat. No. 3,679,275 issued July 25, 1972 and the patent references listed in these patents.

Such slides are widely used to support drawers for movement into and out of a frame or support structure. The ball bearings, in the raceways, are ideal anti-friction means for supporting the drawers for free and easy movement between their retracted and projected positions.

In some cases, such as in cash register drawer applications, it is convenient and desirable to be able to remove the drawer completely from the cash register to take it, for instance, to another cash register or to the accounting office. This may be done by longitudinally separating the two telescopically related track members supporting each side of the drawer. That is, the track members may be constructed so that the track member attached to the drawer can be longitudinally separated from the track member connected to the frame of the cash register merely by pulling the drawer beyond its normal projected position.

The present invention provides means for locking the bearing retainer against movement from a predetermined locking position relative to one of the track members when the other of the track members is moved longitudinally out of engagement with the said one track member. The locking means preferably includes a locking member carried on the retainer and a cooperating locking member carried on the said one track member, the locking members being engageable when the retainer is in its said locking position and the said other track member is disengaged from the said one track member. In the cash register drawer application, when the cash register drawer is moved beyond its normal projected position to disengage the track members attached thereto from their cooperating track members attached to the frame of the cash register, it is desirable to hold the bearing retainers adjacent the outermost end portions, respectively, of the track members attached to the cash register frame. Then, when a different drawer or the same drawer is inserted back into the empty cash register, the track members attached to the drawer should be substantially fully engaged with their respective retainers before the retainers start moving inwardly. For this reason, the track members attached to the drawer are proportioned and designed to disengage the locking members holding the retainers when the said track members are moved into reengagement with the track members attached to the cash register frame.

Other objects and features of the present invention will become apparent as this description progresses.

To the accomplishment of the above and related objects, this invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 1 is a fragmentary perspective view of a portion of a cash register frame and the drawer of a cash register showing the drawer movably supported on a slide in accordance with the present invention;

FIG. 2 is a fragmentary and enlarged sectional view of the slide shown in FIG. 1;

FIG. 3 is a fragmentary view, partially cut away, showing the retainer lock in its locked position;

FIG. 4 is a view similar to FIG. 3 and showing the retainer lock in its releasing position;

FIG. 5 is a fragmentary and partially cut away view showing the retainer lock gravity biased into its locking position; and FIG. 6 is a view similar to FIG. 5 showing the retainer lock raised from its locking position.

Referring now to the drawings, it will be seen that there is illustrated a slide 10 disposed on a cash register frame 12 movably to support the cash and change drawer 14 of the register. The slide 10 comprises an outer, elongated track member 16 and a cooperating, inner, elongated track member 18. The outer member 16 is attached to the frame 12 and the inner member 18 is rigidly attached to the drawer 14. It will be appreciated that the cash register application is merely illustrative, and that the present invention has many applications.

As best seen in FIG. 2, the outer track member 16 is formed to provide an upper, downwardly facing raceway 20 and a lower, upwardly facing raceway 22 while the inner track member 18 is formed to provide an upper, upwardly facing raceway 24 in mating registry with the raceway 20 and a lower, downwardly facing raceway 26 in mating registry with the raceway 22. Ball bearings 28 are disposed in these vertically registered raceways as illustrated. The raceways may be formed by conventional roll forming processes to have the desired raceway cross sections for rollably receiving the ball bearings 28. The manner in which such raceways are formed is quite conventional, and such raceways are shown, for instance, in the U.S. Pat. Nos. 3,205,025 and 3,488,097 identified above.

In FIG. 2, the outer member 16 is shown attached to the frame 12 by means of a screw 32 while the inner member 18 is shown attached to the drawer 14 by means of a screw 30.

In the drawings, the arrow 34 represents the direction the drawer 14 moves to its projected position and the arrow 36 represents the direction the drawer 14 moves to its retracted position.

The slide 10 comprises a bearing retainer 40 having an elongated central body portion 42 formed as a channel section as best seen in FIG. 2 opening toward the central body portion of the outer track member 16. This channel section 42 has upper and lower generally horizontally and longitudinally extending wall sections 43.

The retainer 40 also has upper and lower flange portions 44, 46 extending, respectively, into the upper and lower ball raceways. These flange portions 44, 46 are apertured to receive the ball bearings 28. Preferably, each flange portion 44, 46 is formed with slits such as indicated at 47 between adjacent bearing receiving apertures, such slits being conventional as illustrated in the prior United States patents cited above.

The bearing retainer 40 is proportioned and designed such that, when the inner track member 18 is longitudinally removed from the outer track member 16, the bearing retainer will stay in the outer track member and will hold the ball bearings 28 in the downwardly facing raceway 20 and in the upwardly facing raceway 22. As seen best in FIG. 2, the apertures in the flange portion 44 are slightly smaller in diameter than the ball bearings 28 to prevent the ball bearings from dropping through the apertures when the inner track member with its raceways 24, 26 is removed.

In the preferred embodiment, the outer track member 16 is provided with stop means such as indicated at 50 in FIG. 3 which engages the retainer 40 and prevents it from moving in the direction of the arrow 34 out the end of the track member when the drawer 14 is pulled out. It will be noted that the drawings of FIG. 3 and of FIG. 4 are reversed relative to FIG. 1 for convenience. In FIG. 1, the arrow 34 is shown going to the right while, in FIGS. 3 and 4, the arrow is shown going to the left. It may be assumed that FIGS. 3 and 4 show the slide identical to the slide 10 on the opposite side of the cash drawer 14.

The other end of the outer track member 16 is formed with a stop means 52 which engages stop means 54 on the inner track member 18 to limit the movement of the track member 18 in the direction of the arrow 36. In the view of FIG. 1, therefore, the drawer 14 is shown in its fully retracted position.

Turning first to FIGS. 3 and 4, an illustrative locking means for the retainer 40 will be discussed, the locking means including a locking member 58 carried on the retainer and a locking member 60 carried on the track member 16. In the illustrative embodiment, the stop member 60 is a stop pin extending into the channel section 42 of the retainer while the lock member 58 is an elongated, wire-like member one end of which is fixed as indicated at 62 within the channel section 42. The member 58 extends longitudinally along the channel section 42, and is formed to provide a locking portion or hook portion 64 which engages the pin 60 and an actuator portion 66 which projects upwardly through an elongated slot 68 in the wall section 43.

In the embodiment of FIGS. 3 and 4, the locking member 58 is spring-like such that it is biased upwardly to project its actuator portion 66 into the path of the inner track member 18. As best seen in FIG. 3, the actuator portion 66 extends upwardly into the raceway for the ball bearings 28. In FIG. 3, the hook portion or locking portion 64 is shown engaged with the lock member 60 (lock pin 60) to prevent the retainer 40 from moving in the direction of the arrow 36. In that position, retainer 40 is prevented from moving in the direction of the arrow 34 by the previously-discussed stop means 50. Thus, the position of the retainer 40 in FIG. 3 is its before-mentioned predetermined locking position. When the track member 18 is reengaged with the outer track member 16 and moved longitudinally in the direction of the arrow 36, the portion of the track member 18 defining the upper raceway 24 engages the actuator portion 66 to move it downwardly to disengage the hook portion 64 of the locking member 58 from the locking member 60 to permit the retainer to move in the direction of the arrow 36. Since the actuator portion 66 is disposed adjacent the inner end portion of the retainer 40 (right-hand end in FIG. 3), it will be appreciated that the inner track member 18 will preferably be substantially fully engaged with the retainer 40 by the time the retainer is released for movement in the direction of the arrow 36. This condition is shown in FIG. 4.

When the inner track member 18 is engaged with the outer track member 16, the portion of the inner track member 18 providing the raceway 24 holds the locking member 58 in a position such that it cannot engage the locking member 60.

When the inner member 18 is moved in either direction, the retainer 40 will tend to move in the same direction, but at a slower speed. When the inner member 18 is moved from its illustrated position in FIG. 4 in the direction of the arrow 34, the retainer 40 will move in the direction of the arrow 34 until it strikes the stop means 50. Continued movement of the inner member 18 in the direction of the arrow 34 will release the actuator portion 66 to permit locking of the retainer 40 in its said predetermined position.

Turning to FIGS. 5 and 6, it will be seen that the locking member 58 functions in substantially the same manner it functions in FIGS. 3 and 4, except that, in the embodiment of FIGS. 5 and 6, it is gravity biased toward its locking position. In FIG. 5, the retainer 40 is shown in its locked position at the extent of its movement in the direction of the arrow 34 with the locking member 58 being positioned to prevent it from moving inwardly in the direction of the arrow 36. FIG. 6 shows the locking member 58 in its disengaged position to which it is lifted by the movement of the inner member 18 inwardly in the direction of the arrow 36.

Thus, in the embodiment of FIGS. 3 and 4, the locking member 58 is spring-biased toward its position of engagement with the locking member 60 while in the embodiment of FIGS. 5 and 6 the locking member 58 is gravity-biased toward its position of engagement with the locking member 60. It will be appreciated that, for instance, the locking member 58 of the embodiment of FIGS. 5 and 6 may be biased by both gravity and spring forces toward engagement with the pin 60. It will further be appreciated that the spring forces may be provided by the spring-like nature of the member 58 itself or by the provision of another spring member which acts upon the member 58.

Further, within the scope of the present invention, a relatively stationary lock member, such as the pin 60, may be placed on the retainer 40 while the relatively movable lock member, such as the member 58, may be placed on the outer track member 16 so that it will move into engagement with the lock member on the retainer and so that it will be disengaged by the inner track member 18.

What is claimed is:

1. A slide comprising a first elongated track member formed to provide a downwardly facing longitudinal raceway and an upwardly facing longitudinal raceway, a second elongated track member formed to provide an upwardly facing longitudinal raceway in mating registry with the first said downwardly facing raceway and a downwardly facing longitudinal raceway in mating registry with the first said upwardly facing raceway, bearings disposed in said mating raceways to support said track members for relative longitudinal movement, bearing retainer means for maintaining the longitudinal spacing between said bearings in said raceways, said retainer means being longitudinally movable relative to said track members, and means for locking said retainer means against any appreciable movement from a predetermined locking position relative to one of said track members when the other of said track members is moved longitudinally out of engagement with said one track member, said locking means including a locking member carried on said retainer means and a cooperating locking member carried on said one track member, said locking members being engageable when said retainer means is in its said locking position and said other track member is disengaged from said one track member.

2. The slide of claim 1 in which said other track member is proportioned and designed to disengage said locking members when said other track member is moved into reengagement with said one track member.

3. The slide of claim 1 in which said one track member is provided with opposite end portions, said cooperating locking member being disposed adjacent one end portion of said one track member, said one end portion being provided with stop means preventing movement of said retainer means longitudinally out of engagement with said one end portion.

4. The slide of claim 3 including second stop means for preventing said other track member from moving longitudinally out of engagement with the opposite end portion of said one track member.

5. The slide of claim 4 in which said other track member is proportioned and designed to disengage said locking members when said other track member is moved longitudinally into reengagement with said one end portion.

6. The slide of claim 5 in which the first said locking member is biased toward engagement with said cooperating locking member, the first said locking member including an actuator portion projecting into the path of said other track member as it moves longitudinally into engagement with said one end portion.

7. The slide of claim 1 in which one of said locking members is biased toward locking engagement with the other of said locking members, said one of said locking members including an actuator portion projecting into the path of said other track member as it moves longitudinally relative to said one track member, said other track member being proportioned and designed to engage said actuator portion to prevent locking engagement of said locking members while said track members are engaged.

8. The slide of claim 1 in which said raceways are in vertical registry to provide upper and lower mating raceways, said retainer means including an elongated member having a central body portion and upper and lower flange portions extending respectively into said upper and lower raceways to engage the bearings therein, the first said locking member being biased toward engagement with said cooperating locking member, the first said locking member being carried on said central body portion and including an actuator portion projecting into one of said raceways, said other track member being effective to engage said actuator portion to prevent locking engagement of said locking members while said track members are engaged.

9. The slide of claim 8 in which said one track member includes a longitudinally extending central body portion parallel and adjacent to said central body portion of said retainer means, said cooperating locking member being carried on the central body portion of said one track member.

10. The slide of claim 9 in which said central body portion of said retainer means is formed as a channel section opening toward said one track member and including upper and lower longitudinally extending wall sections, the first said locking member being disposed within said channel section, and said cooperating locking member being disposed to project into said channel section.

11. The slide of claim 10 in which one of said wall sections is provided with an aperture through which said portion extends to project into one of said raceways.

12. A slide comprising a pair of telescopically related track members, ball bearings supporting said track members for relative longitudinal movement, retainer means for said ball bearings, said retainer means being longitudinally movable relative to said track members, and means for locking said retainer means against any appreciable movement from a predetermined locking position relative to one of said track members when the other of said track members is moved longitudinally out of engagement with said one track member, said locking means including a locking member carried on said retainer means and a cooperating locking member carried on said one track member, said locking members being engageable when said retainer means is in its said locking position and said other track member is disengaged from said one track member.

13. The slide of claim 12 in which said other track member is proportioned and designed to disengage said locking members when said other track member is moved into reengagement with said one track member.

14. The slide of claim 12 in which said one track member is provided with opposite end portions, said cooperating locking member being disposed adjacent one end portion of said one track member, said one end portion being provided with stop means preventing movement of said retainer means longitudinally out of engagement with said one end portion.

15. The slide of claim 12 in which one of said locking members is biased toward locking engagement with the other of said locking members, said one of said locking members including an actuator portion projecting into the path of said other track member as it moves longitudinally relative to said one track member, said other track member being proportioned and designed to engage said actuator portion to prevent locking engagement of said locking members while said track members are engaged.

* * * * *